United States Patent [19]

Muirhead et al.

[11] Patent Number: 5,280,751
[45] Date of Patent: Jan. 25, 1994

[54] RADIO FREQUENCY DEVICE FOR MARKING MUNITION IMPACT POINT

[75] Inventors: James O. Muirhead, Torrance; Gerald E. Held, Santa Ana, both of Calif.

[73] Assignee: Hughes Aircraft Company, Los Angeles, Calif.

[21] Appl. No.: 798,480

[22] Filed: Nov. 26, 1991

[51] Int. Cl.$^5$ .................................. F42B 12/40
[52] U.S. Cl. ................. 102/210; 102/293; 102/513
[58] Field of Search .......... 102/513, 210, 293; 89/1.11; 434/17

[56] References Cited

U.S. PATENT DOCUMENTS 4,796,834  1/1989  Ahlstrom ........................... 89/1.11
5,014,062  5/1991  Schriner et al. ..................... 102/210

Primary Examiner—Charles T. Jordan
Attorney, Agent, or Firm—Wanda K. Denson-Low

[57] ABSTRACT

A munition incorporating a miniature transmitter (25) and a piezoelectric power supply (45) which converts a portion of the kinetic energy of the projectile (20), upon impact, into radio frequency energy and radiates that energy into space. The transmitter (25) can be made in suitable sizes to fit various calibers of ammunition. Different caliber ammunition can be made to radiate different frequencies. The transmitted RF energy allows the point of impact of the projectiles to be located with a high degree of precision. This type of munition may be used in the scoring of air to ground gunnery in training environments by receiving the RF energy at several known locations and determining the point of impact using time of arrival or angle of arrival techniques. Frequency discrimination allows simultaneous scoring of multiple weapons from the same aircraft or from multiple aircraft. The munition may be employed in tactical applications by allowing the fall of fire to be located and adjusted.

13 Claims, 3 Drawing Sheets

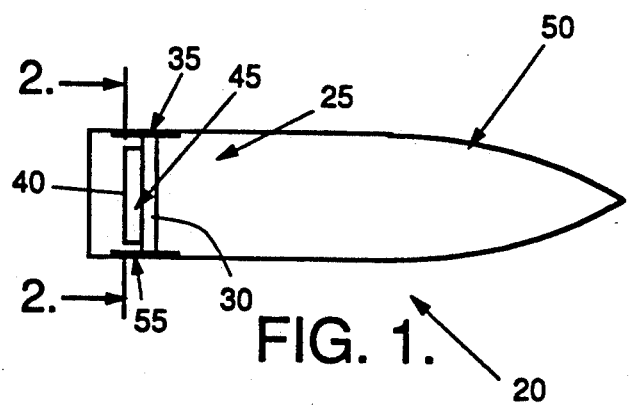
FIG. 1.
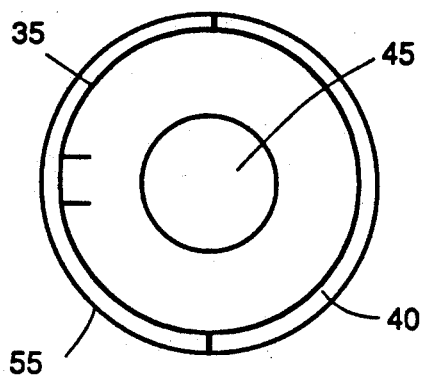
FIG. 2.
FIG. 3.
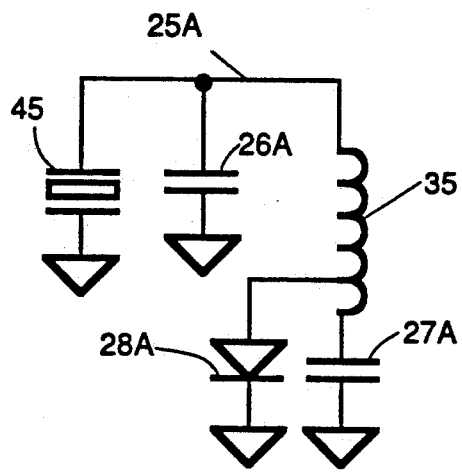
FIG. 4.
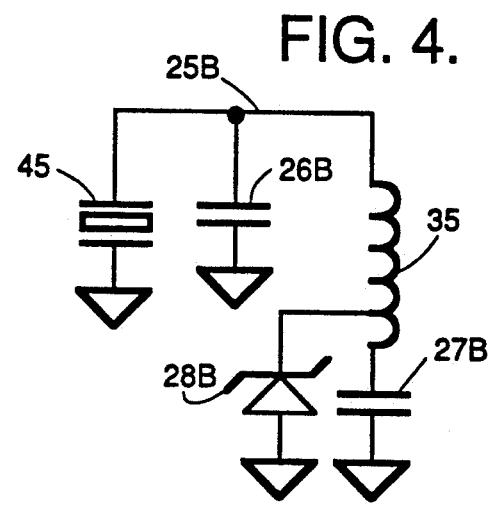
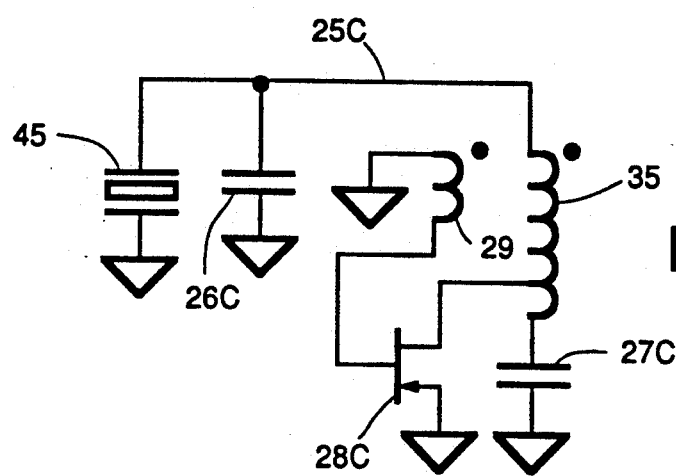
FIG. 5.

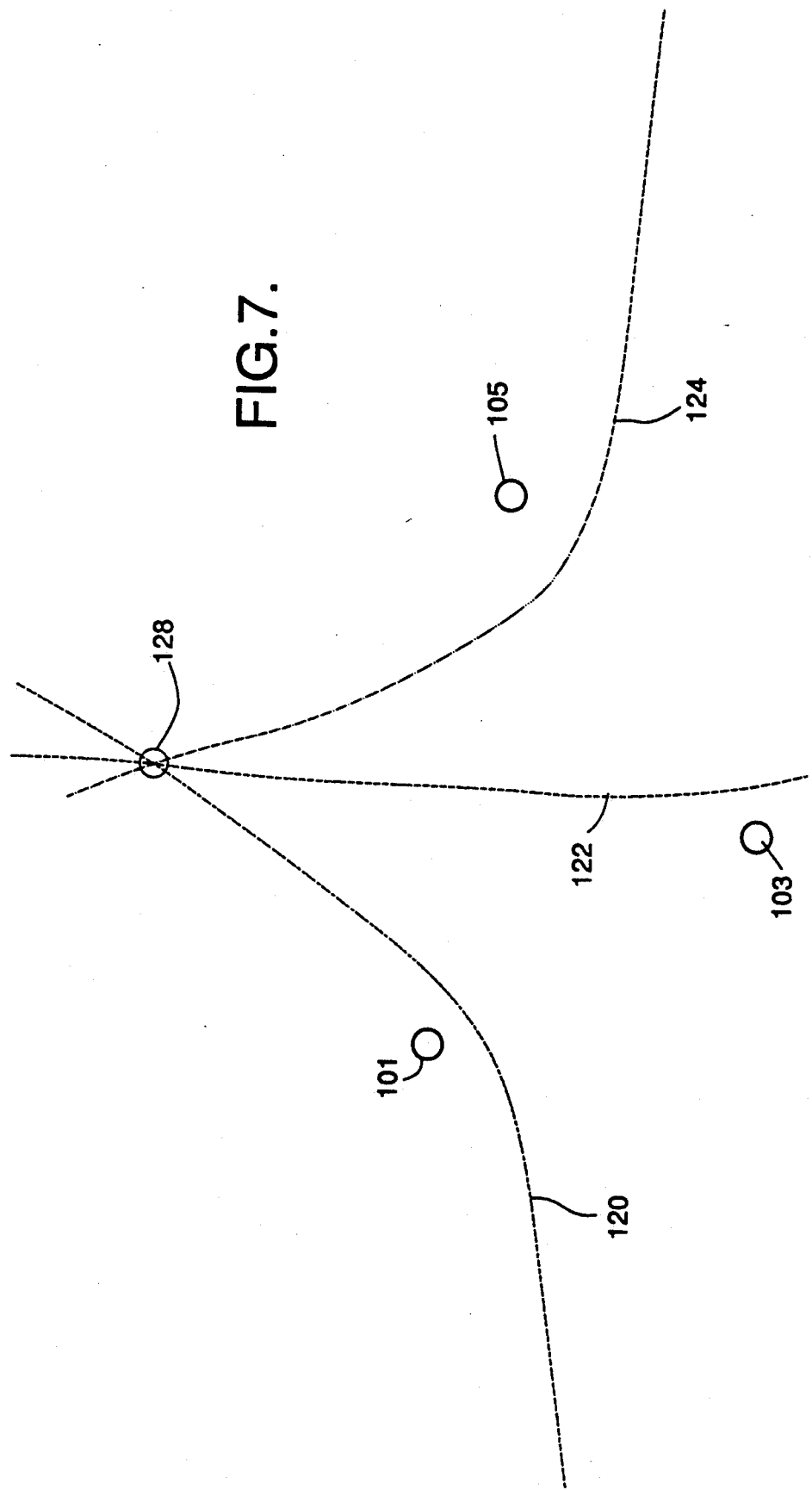

RADIO FREQUENCY DEVICE FOR MARKING MUNITION IMPACT POINT

BACKGROUND OF THE INVENTION

The present invention relates to munitions, and more particularly to apparatus which identifies the impact point of munitions.

Conventional air-to-ground gunnery scoring uses acoustic receivers or visual observation of the fall of fire by remotely located observers using binoculars. The acoustic scoring method is subject to noise interference from other aircraft. The visual scoring system relies on the skill and reaction times of human observers.

It would therefore provide an advance in the munitions art to provide a munition projectile which provides an impact point locating signal upon impact, and which is not subject to noise interference from other aircraft and does not rely on the skill of human observers.

SUMMARY OF THE INVENTION

The present invention is embodied, in a general sense, in an impact marking munition projectile which includes a projectile body and a miniature RF transmitter integrated with the projectile body. The transmitter comprises an oscillator circuit, an antenna, and a power supply, and radiates RF energy into space upon projectile impact, thereby generating a signal indicative of the impact position of the projectile. The power supply comprises a piezoelectric element which, upon impact of the projectile body, develops a potential difference to power the oscillator circuit, thereby converting a portion of the kinetic energy of the projectile into RF energy which is radiated into space via the antenna.

In one embodiment, the munition projectile is fireable from a gun and comprises an antenna protection band fitted around the periphery of the projectile body for protecting the antenna from the stresses of firing. The protection band is thrown off the body by centrifugal force due to projectile spin when the projectile exits the gun to expose the antenna.

The oscillator circuit in a preferred embodiment comprises a resonant circuit comprising the antenna, which is a loop antenna extending about the periphery of the projectile body such that the resonant frequency of said oscillator circuit depends upon the projectile size. Thus, the frequency of operation of the oscillator circuit is dependant on the projectile caliber.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a side view of a munition projectile embodying the present invention.

FIG. 2 is a cross-sectional view of the projectile of FIG. 1, taken along section line 2—2 of FIG. 1.

FIGS. 3-5 are circuit schematic diagrams of exemplary oscillators circuits which may be employed in the munition projectile of FIG. 1.

FIG. 7 illustrates the operation of the system of FIG. 6.

DETAILED DESCRIPTION OF THE PREFERRED EMBODIMENT

Figure 6:
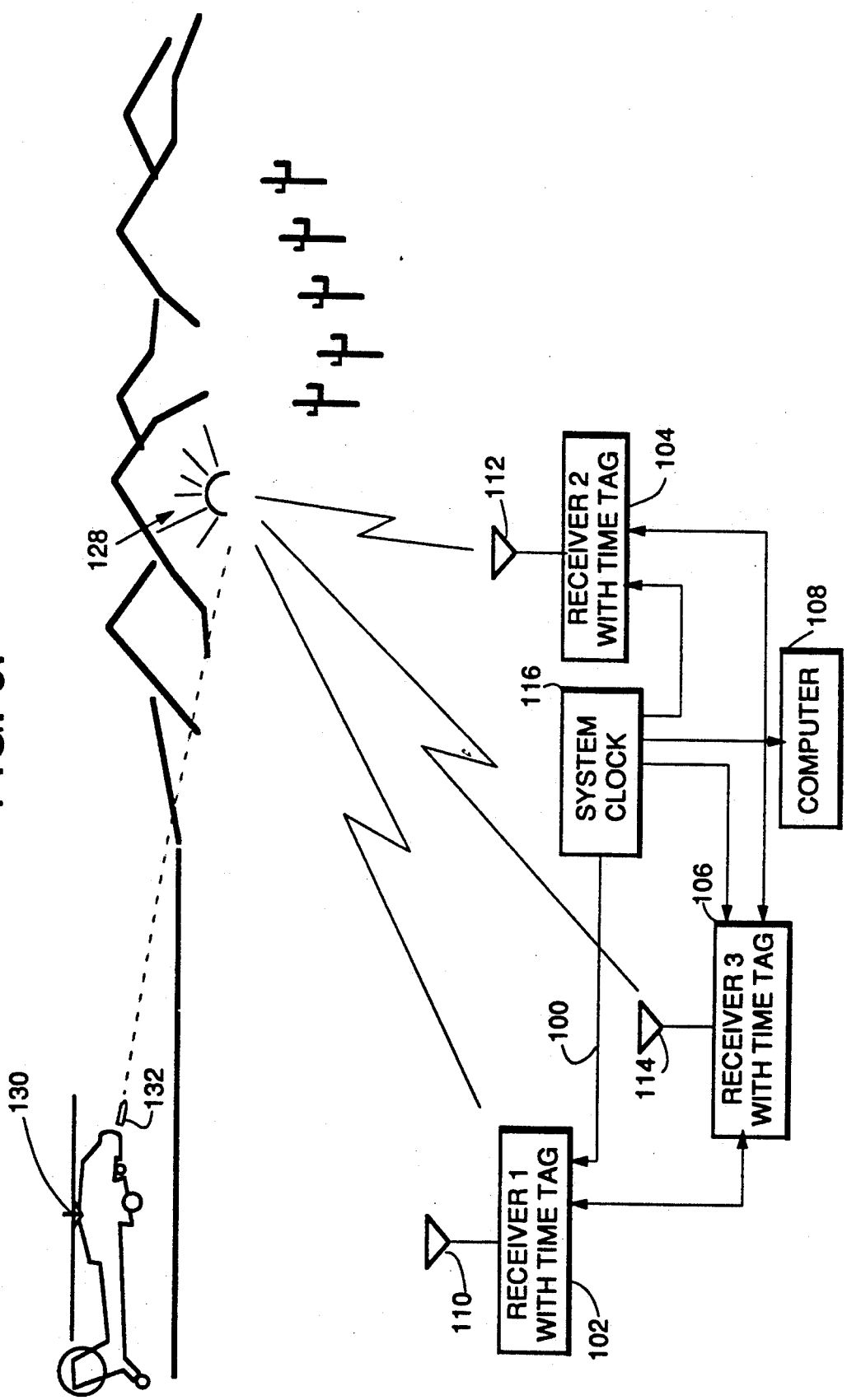
FIG. 6 is a pictorial block diagram of a time-of-arrival system employing a projectile as described in FIGS. 1-5.

The present invention comprises a munition incorporating a miniature transmitter and a piezoelectric power supply which converts a portion of the kinetic energy of the projectile, upon impact, into radio frequency energy and radiates that energy into space. The transmitter can be made in suitable sizes to fit various calibers of ammunition. Different caliber ammunition can be made to radiate different frequencies. The transmitted RF energy allows the point of impact of the projectiles to be located with a high degree of precision. FIGS. 1 and 2 illustrate in simplified form a projectile 20 equipped with an RF transmitter device in accordance with the invention.

The transmitter 25 in this embodiment is an RF oscillator circuit 30 with an integral omnidirectional antenna 35 built on a disk shaped dielectric substrate 40. The electrical power supply for the transmitter 25 is a piezoelectric material 45 incorporated into the disk. The projectile 20 comprises a projectile body 50 which will be fired from a gun.

Upon projectile impact, the piezoelectric material 45 is compressed by the sudden deceleration resulting in an electrical potential across it. The RF oscillator 30 converts the electrical potential to RF energy and radiates it into space by means of the integral loop antenna 35 which is part of the tuned circuit of the oscillator 30. Because the loop antenna 35 is part of the resonant circuit of the oscillator 30, the transmitters for each caliber of ammunition can be made to radiate different frequencies as a function of the diameter of the antenna loop 35. The transmitted frequencies of the various projectiles could be in the microwave band from one to ten GHz, by way of example. The smaller diameter projectiles, e.g., on the order of 0.22 to 0.5 inch can be made to radiate at the higher end of the frequency band and the larger diameter projectiles, e.g., on the order of 0.5 to 5 inches, can be made to radiate in the lower end of the frequency band. The capacitance of the resonant circuit may be varied to provide different radiated frequencies from the same caliber ammunition to simplify scoring of simultaneous firings from different guns. With the antenna 35 being an integral part of the resonant circuit, the capacitance of the resonant circuit can be varied by changing the geometry, thickness and width of the antenna and the placement of the antenna in respect to the other elements of the projectile.

The use of suitable piezoelectric material and an appropriate oscillator design can yield peak pulse powers of several hundred milliwatts or more when the projectile impacts the ground or a hard target. The desired piezoelectric material must withstand the forces associated with the firing of the projectile and then upon impact provide the necessary electrical energy to power the transmitter. Exemplary piezoelectric material suitable for the purpose are the piezoelectric ceramics such as Barium Titanate and Lead Zironate Titanate; other materials that exhibit piezoelectricity include quartz and Kynar plastic.

The oscillator active element can be a bipolar transistor, a microwave field effect transistor (FET), GUNN diode, an IMPATT diode or other suitable technology.

The hardness and the angles at which the projectile strikes an object will determine the amplitude and duration of the deceleration forces within the projectile. The internal deceleration forces acting upon the piezoelectric power supply will determine the amplitude and duration of the electrical energy provided to the transmitter and thus the duration on the transmitted pulse. With a projectile moving at 2500 ft/sec, the projectile requires thirty-three (33) microseconds to travel one (1) inch. The monolithic wafer will be destroyed by impact several microseconds after initial impact on a hard target. This is sufficient time for the wafer to radiate a large energy pulse of short duration.

FIGS. 3-5 are representative of exemplary transmitter circuits that can be employed in a munition embodying the invention; the particular type depends on the microcircuit technology used for the active device of the oscillator. Thus, circuit 25A comprises a microwave GUNN diode as the active device. The parallel combination of the piezoelectric material 45 and a capacitance 26A is connected in series with the antenna band 35 and the parallel combination of the active device 28A and a second capacitance 27A. The circuit 25B is similar to circuit 25A, except that a microwave IMPATT diode 28B is used as the oscillator active element. Circuit 25C employs a microwave FET 28C as the active element. The base of the FET 28C is transformer coupled to the antenna 35 by an inductance 29.

The transmitter 25 is monolithic and rugged in order to survive the chamber pressure on the order of 50,000 psi when being fired from a gun. The transmitters elements are formed on a single monolithic wafer with the piezoelectric material bonded to it in such a manner so as to survive the chamber pressure on the order of 50,000 psi when fired from a gun. The monolithic wafer is a single integrated substrate containing all necessary transmitter components including the antenna and the piezoelectric material arranged in a manner to provide balance and stability during projectile spin, for example, on the order of 3300 revolutions per second. The transmitter is concentrically mounted to enable stable spin and minimize wobble of the projectile and so that it withstands the centrifugal force due to the projectile spin and stays attached to the projectile to the point of impact. The diameter of the transmitter loop antenna must be made smaller in diameter than the diameter of the projectile body when used in rifled barrels in order that the lands of the barrel rifling do not damage the antenna when the weapon is fired.

A discarding protection band 55 isolates the transmitter loop antenna from the combustion gasses of the burning propellant, aids in seating the projectile in the gun barrel and provides increased resistance to compression of the transmitter 25 by the chamber pressure when the munition is fired. A purpose of the protective band is to prevent the annular antenna from being damaged by the lands in the barrels of rifled weapons. Because the projectile may attain spin rates up to 3300 revolutions per second, the band, if left in place, could stretch and affect the projectile trajectory. To prevent this, the band is made in two pieces such that the centrifugal force of the projectile spin will cause it to separate from the projectile.

The protective band may be made of suitable plastic material or a wax impregnated paper. It is inserted in an annular groove around the antenna. The band is split to form two half circles with the ends thereof meeting when mounted in the groove. The centrifugal force from the spin of the projectile causes the split band elements to be thrown from the projectile when it exits the muzzle of the gun.

The separation of the band from the projectile is not critical to the operation of the RF device itself. The use of material with suitable dielectric properties will allow the device to function with the band in place. When the RF device is employed on munitions such as rockets and smooth bore cannon, the band may stay in place.

A particular value of this type of munition is the scoring of air to ground gunnery in training environments by receiving the RF energy at several known locations and determining the point of impact using time of arrival or angle of arrival techniques. The time-of-arrival technique requires three or more receivers, with either directional or omni antennas, located at known, separate coordinates. FIG. 6 is a pictorial block diagram of a time of arrival system. In this example, a projectile 132 embodying the invention is fired from a helicopter 130, and impacts the ground or target at point 128. At impact, a pulse of radio frequency energy is generated. In this example, the system 100 comprises receivers 102, 104 and 106 located at receiving stations 101, 103 and 105 at known separate coordinates, each tuned to the radio frequency bands corresponding to the types of munitions to be used. The system 100 further includes a central computer 108.

Each receiver 102, 104 and 106 has associated therewith a corresponding antenna. The antenna patterns are selected for the particular application. For example, for a small impact area at a distance, directional antennas would be aimed at the impact area. Omnidirectional antennas may be used for larger impact areas. Thus, receiver 102 is responsive to signals received at antenna 110, receiver 104 is responsive to signals received at antenna 112, and receiver 106 is responsive to signals received at antenna 114.

The time of arrival of the RF signal at each receiver may be measured with a high degree of precision using a dedicated system clock 116. The difference in the times of arrival of the RF energy at any two receivers defines a hyperbolic line of position upon which the munition impacted. The intersection of these lines of position is the location of the impact, as illustrated in FIG. 7. Thus, the line of position between the stations 101 and 103 of receivers 102 and 104 is line 120, the line of position between the stations 101 and 105 of receivers 102 and 106 is line 122, and the line of position between stations 103 and 105 is line 124. The impact point 128 is the intersection of these lines of position.

The angle of arrival technique employs two or more radio frequency receiver sites located at known, separate coordinates. Each site has receivers tuned to the radio frequency bands corresponding to the types of munitions to be used. The receiver antennas would be of the monopulse type with antenna patterns covering the projectile impact area of interest. Conventional monopulse and lines of intersection techniques could be employed to derive the geographical location of each projectile impact.

Frequency discrimination of the munitions allows simultaneous scoring of multiple weapons from the same aircraft or from multiple aircraft. The projectile transmitter also has value in tactical applications by allowing the fall of fire to be located and adjusted.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An impact marking munition projectile, comprising:
   a projectile body;
   a miniature RF transmitter integrated with said projectile body and comprising an oscillator circuit, an antenna, and a power supply, said transmitter for radiating RF energy into space upon projectile impact, thereby generating a signal indicative of the impact position of said projectile; and
   wherein said power supply comprises a piezoelectric element which, upon impact of said projectile body, develops a potential difference to power said oscillator circuit, thereby converting a portion of the kinetic energy of said projectile into RF energy which is radiated into space via said antenna, and wherein said antenna comprises a loop antenna extending about the periphery of said projectile body such that the resonant frequency of said oscillator circuit depends upon the projectile size, wherein the frequency of operation of said oscillator circuit is dependent on the projectile caliber.

2. The munition projectile of claim 1 wherein said projectile is further characterized in that it is fireable from a gun and comprises an antenna protection band fitted around the periphery of said projectile body for protecting said antenna from the stresses of firing, said protection band being thrown off said body by centrifugal force due to projectile spin when the projectile exits the gun to expose said antenna.

3. The munition projection of claim 2 wherein said protection band comprises a plurality of separate band elements which separate and fall away from said projectile after firing.

4. The munition projectile of claim 1 wherein said transmitter and power source are characterized by concentric geometry which is balanced to prevent projectile wobble while in flight.

5. The munition projectile of claim 1 wherein said oscillator circuit comprises an active device selected from the group consisting of an IMPATT diode, a GUNN diode, and a microwave field effect transistor.

6. The munition projectile of claim 1 wherein said antenna is further characterized as omnidirectional.

7. A system for determining the impact location of a munitions projectile, comprising:
   a projectile characterized by a projectile body and a miniature radio frequency transmitter integrated with said body and comprising an oscillator circuit, an antenna and a power supply, said transmitter for radiating radio frequency energy into space upon projectile impact, thereby generating a signal indicative of the impact position of said projectile, and wherein said power supply comprises a piezoelectric element which, upon impact of said projectile body, develops a potential difference to power said oscillator circuit, thereby converting a portion of the kinetic energy of said projectile into radio frequency energy which is radiated into space via said antenna;
   a plurality of receiving sites each at known locations, each site comprising a receiver tuned to the frequency band of the projectile and an antenna for receiving radio frequency energy radiated by said projectile upon impact; and
   processing means responsive to the signals received at said receiving sites for determining the impact location of said projectile.

8. The system of claim 7 further comprising a system clock, means for noting the time at which the radio frequency signals are received at each receiving site, and wherein said processing means comprises means for determining the impact point from the known locations of the receiving sites and the time of arrival of said signals.

9. The system of claim 7 wherein said projectile is further characterized in that it is fireable from a gun and comprises an antenna protection band fitted around the periphery of said projectile body for protecting said antenna from the stresses of firing, said protection band being thrown off said body by centrifugal force due to projectile spin when the projectile exits the gun to expose said antenna.

10. The system of claim 7 wherein said transmitter and power source are characterized by concentric geometry which is balanced to prevent projectile wobble while in flight.

11. The system of claim 7 wherein said oscillator circuit comprises a resonant circuit comprising said antenna, said antenna comprises a loop antenna extending about the periphery of said projectile body such that the resonant frequency of said oscillator circuit depends upon the projectile size, wherein the frequency of operation of said oscillator circuit is dependent on the projectile caliber.

12. The system of claim 7 wherein said oscillator circuit comprises an active device selected from the group consisting of an IMPATT diode, a Gunn diode, and a microwave field effect transistor.

13. The system of claim 7 wherein said antenna of said projectile is further characterized as omnidirectional.

* * * * *